United States Patent

[11] 3,633,785

| [72] | Inventors | Steven J. Cyr;<br>Mark W. Whelan, both of Chippewa Falls, Wis.; Kenneth L. Jones, Fullerton, Calif. |
|---|---|---|
| [21] | Appl. No. | 852,753 |
| [22] | Filed | Aug. 25, 1969 |
| [45] | Patented | Jan. 11, 1972 |
| [73] | Assignee | Standard Oil Company<br>Chicago, Ill. |

[54] HOT FOOD CONTAINER
9 Claims, 2 Drawing Figs.

[52] U.S. Cl. .................................................. 220/20,
206/4, 220/31 5, 229/2.5
[51] Int. Cl. ...................................................... B65d 1/24
[50] Field of Search .......................................... 220/20,
23.6, 23.8, 31 SR; 229/2.5, 29 M; 206/4

[56] References Cited
UNITED STATES PATENTS

| 2,738,915 | 3/1956 | St. Clair .......................... | 229/2.5 |
|---|---|---|---|
| 2,917,216 | 12/1959 | Despres .......................... | 229/2.5 |
| 3,016,129 | 1/1962 | King ............................... | 206/4 |
| 3,107,027 | 10/1963 | Hong ............................... | 220/23.8 |
| 3,145,895 | 8/1964 | Reifers .......................... | 229/2.5 |
| 3,240,610 | 3/1966 | Cease ............................. | 220/23.6 |
| 3,337,110 | 8/1967 | Commisso ....................... | 229/29 M X |
| 3,410,391 | 12/1968 | Kanter ............................ | 220/31 S X |
| 3,477,224 | 11/1969 | Siefert ........................... | 220/31 S UX |
| 3,469,764 | 9/1969 | Gaylord .......................... | 229/2.5 X |

FOREIGN PATENTS

| 296,912 | 5/1932 | Italy .............................. | 229/2.5 |

*Primary Examiner*—George E. Lowrance
*Attorneys*—Arthur G. Gilkes, William T. McClain and John J. Connors

ABSTRACT: Disclosed is a foamed-plastic hot food container including a tray and a cover hinged to the tray. Both the tray and cover include a generally V-shaped divider and support member which divides both the tray and cover into cavity sections and which, when the cover is fitted over the tray, abut each other to impart structural rigidity to the container. The tray also includes cover-receiving means which keeps dirt out of the container and heat in the container.

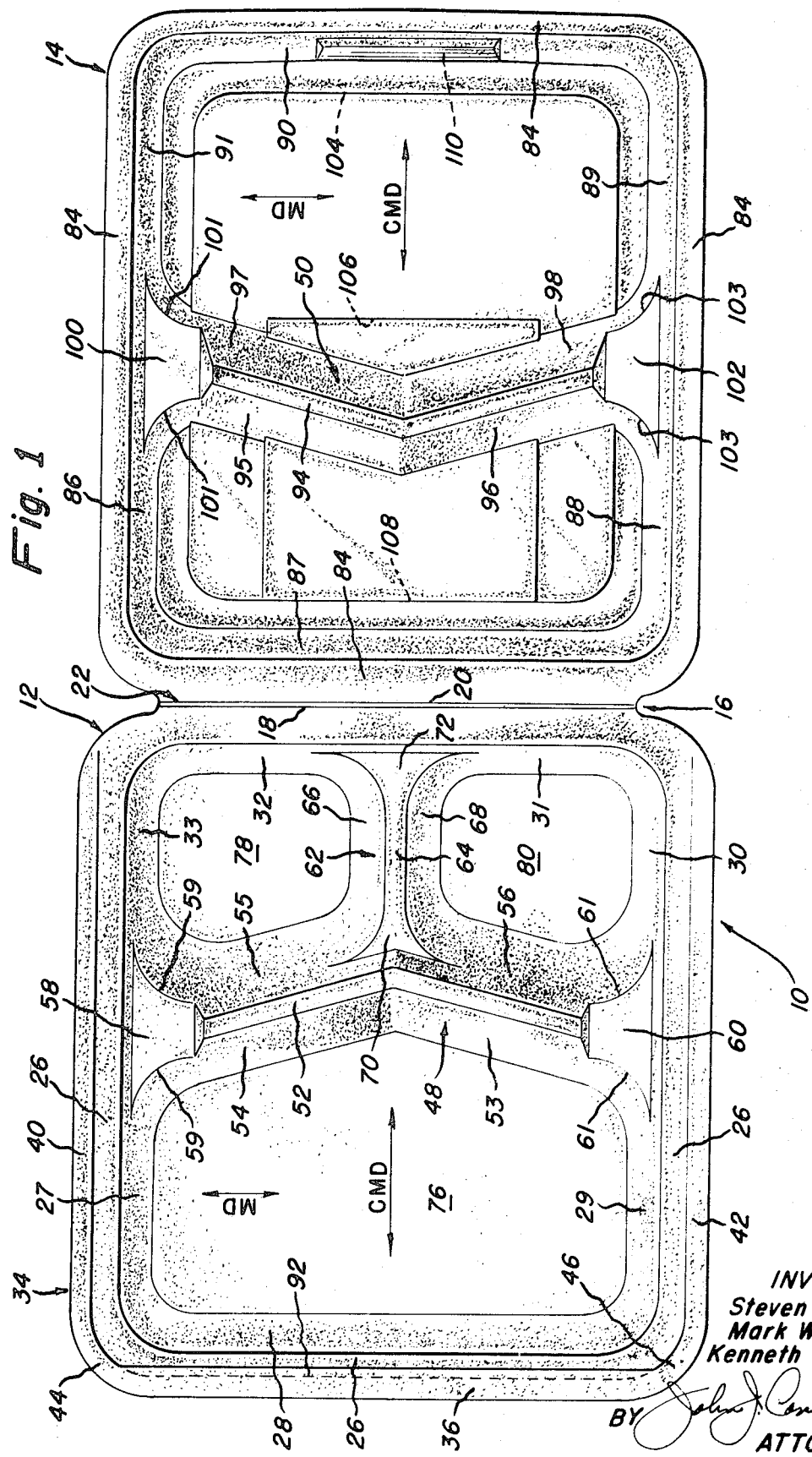

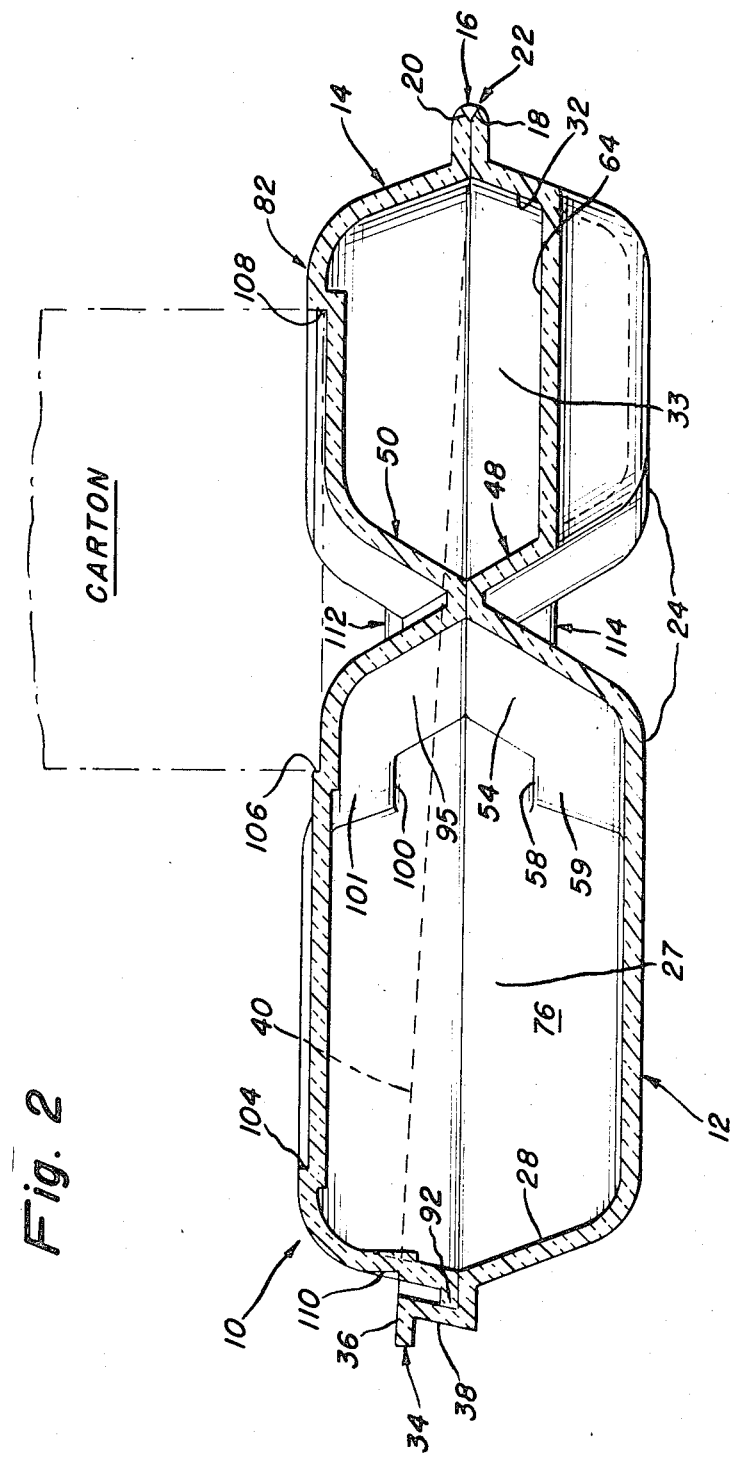

HOT FOOD CONTAINER

BACKGROUND OF THE INVENTION

Plastic foam containers are particularly effective in keeping prepared foods hot while in transit to the consumer. Such a container should be strong, compact, and easily stacked. The container must effectively retain the heat of prepared foods, however, some steam should escape from the closed container so that excess condensation will not accumulate within the container. The container should be able to hold hot food and support additional items such as beverages, silverware, salads, ice cream, and condiments placed on the top of the closed container. It should be compact for easy storing, and designed so that stacking will be facilitated. Moreover, since such containers are frequently used to hold student lunches, the container should in general be easy to handle so that small children can hold and carry it.

DESCRIPTION OF THE INVENTION

We have invented a hot food container which can keep prepared foods hot for extended periods of time. Our container is also strong, compact, and easy to stack and handle. This container, which is made from a continuous sheet of foamed plastic that has a cross-machine direction and a machine direction, comprises two basic elements: a tray and a cover adapted to fit snugly over the tray. The tray and cover are hinged together, and each include a bent divider and support member which divides both the tray and cover into cavity sections and which, when the cover is fitted over the tray, abut each other to impart structural rigidity to the container. These divider and support members are preferably V-shaped, and they generally lie along the machine direction of the plastic. The V-shaped divider and support members each have at their extremities delta ($\Delta$)-like ends in different planes relative to the remainder of their respective V-shaped members. Hence, these delta ($\Delta$)-like ends reinforce the support members. The tray may also include additional divider members for increasing the number of cavity sections.

The tray and cover are hinged together along a contiguous section, and both the tray and cover include circumferential lips which abut when the cover is fitted over the tray. The hinge means comprise two parallel creases in the contiguous section which are about 0.05–0.06 inches wide and about 0.06–0.07 inches apart.

The tray includes a cover-receiving means having a locking portion opposite the contiguous section and a pair of spaced, generally vertical, upwardly projecting flanges which are continuous with the locking portion at the extremities of this portion and which extend from these extremities towards the contiguous section. The flanges are at a maximum height at their points of continuity with the locking portion and thereafter taper towards the contiguous section to become flush with the tray lip near the contiguous section. The locking portion includes a reverse-tapered sidewall into which the cover lip is force fitted upon closing of the cover.

To facilitate stacking, the cover includes a first indentation defining a first surface area adapted to receive therein the base of a stacked container. To facilitate carrying a carton on the top of the container, the cover also includes a second indentation defining a second surface area smaller than the first area. This second area is adapted to receive therein the base of a carton. The first area is above the second area when the cover is fitted over the tray. Preferably, the perimeters of these areas are partially contiguous along a portion of one side of the larger area.

DESCRIPTION OF DRAWINGS

FIG. 1 is a plan view of our container in an open position showing the internal surfaces of the cover and tray.

FIG. 2 is a sectional view of our container showing the cover fitted snugly over the tray.

DESCRIPTION OF PREFERRED EMBODIMENT

Hot food container 10 has two basic elements: tray 12 and cover 14. This container 10 is made from a continuous sheet of foamed plastic so that tray 12 and cover 14 are contiguous at section 16. Two parallel creases 18 and 20 in section 16 serve as hinge means 22. Preferably these creases 18 and 20 are about 0.05–0.06 inches wide and about 0.06–0.07 inches apart. Cover 14, when folded over at these creases 18 and 20, comes into registration with tray 12, covering the tray as illustrated in FIG. 2.

Tray 12 includes base 24 (FIG. 2), flat circumferential lip 26 (FIG. 1), and acclivitous sidewalls 27–33 which connect the base to the lip. Integral with lip 26 is generally U-shaped cover-receiving means 34. This means 34 includes locking portion 36 having a Z-cross section incorporating reverse-tapered sidewall 38 (FIG. 2) and vertical flanges 40 and 42 which merge with extremities 44 and 46 of locking portion 36. These flanges 40 and 42 are continuous with extremities 44 and 46, and their maximum height is at these points of continuity. Flanges 40 and 42 taper towards contiguous section 16 to merge with lip 26, serving to close off the abutting lips of tray 12 and cover 14 when the cover is shut. However, because the seal which they provide is not absolutely airtight, some steam can escape from container 10. Nevertheless, flanges 40 and 42 effectively keep heat from rapidly leaking out of container 10 and prevent dirt from entering it.

The foamed plastic, from which container 10 is made, is biaxially orientated. Because of the way in which this plastic is manufactured, it is said to have a machine direction (MD) and a cross-machine direction (CMD). Since it is easier to fold the plastic over a line along the MD than over a line along the CMD, the plastic is not equally rigid in both directions. The bent divider and support members 48 and 50 in tray 12 and cover 14, respectively, provide reinforcement along the MD as well as divide container 10 into cavities. These members 48 and 50 have a generally V-shape as viewed in FIG. 1, and a generally V-cross-section as viewed in FIG. 2. Because of this bent, V-shaped configuration, they impart rigidity to a closed container so that one container can be readily stacked upon another without crushing the supporting container. Members 48 and 50 are essentially mirror images of each other, and they are positioned relative to each other so that, upon closing cover 14, they abut each other.

Member 48, lying generally along the MD of the plastic, includes V-shaped ridge 52, and acclivitous transverse sidewalls 53–56 that straddle ridge 52 and connect the ridge with base 24 of tray 12. At the extremities of member 48 are flat, delta ($\Delta$)-like ends 58 and 60 recessed below the plane of ridge 52 about midway between lip 26 and base 24. These delta ($\Delta$)-like ends 58 and 60 have, respectively, curved sides 59 and 61 which blend into, respectively, sidewalls 27 and 33, and sidewalls 29 and 30. Because of this configuration, they impart laterally structural strength to support member 48. Due to the V-shape of member 48 as well as the delta ($\Delta$)-like ends 58 and 60, it thus becomes very difficult to fold tray 12 along the machine direction (MD). This is a highly desirable structural feature.

Tray 12 may also include I-shaped divider member 62 disposed generally transverse to the MD of the plastic. This member 62 includes I-shaped ridge 64 which is about midway between base 24 and lip 26, and acclivitous sidewalls 66 and 68 which straddle ridge 64 and connect the ridge with base 24 of tray 12. Ends 70 and 72 of this member 62, tapering outwardly, merge respectively with member 48 and walls 31 and 32.

Sidewalls 27, 28, 29, 53, and 54 define an enlarged cavity 76. Because of the V-shape of support member 48, the volume of this cavity is increased over what would be attainable using a straight support member. Two other cavities 78 and 80 are also provided. Cavity 78 is defined by sidewalls 33, 55, 66, and 32, and cavity 80 is defined by sidewalls 68, 56, 30, and 31. Cavities 76, 78, and 80 are designed to store food.

Cover 14 includes top 82 (FIG. 2), flat circumferential lip 84 (FIG. 1), and acclivitous sidewalls 86–91 which connect the top to the lip. When container 10 is closed as shown in FIG. 2, V-shaped members 48 and 50 are abutting each other, and lip 84 is seated within receiving means 34 and abuts lip 26, with edge 92 of lip 84 force-fitted into locking portion 36.

V-shaped member 50 within cover member 14 is substantially identical to V-shaped member 48 in tray 12. Member 50, lying generally along the MD of the plastic, includes V-shaped ridge 94, and acclivitous transverse sidewalls 95–98 that straddle ridge 94 and connect the ridge with top 82 of cover 14. With cover 14 closed, ridge 94 abuts ridge 52 of member 48. At the extremities of member 50 are flat, delta ($\Delta$)-like ends 100 and 102 recessed below the plane of ridge 94, as viewed in FIG. 1, about midway between lip 84 and top 82. These delta ($\Delta$)-like ends 100 and 102 have, respectively, curved sides 101 and 103 which blend into, respectively, sidewalls 86 and 91, and sidewalls 88 and 89. Thus, lateral structural strength is imparted to member 50.

Top 82 of cover 14 can be used to support stacked containers and cartons such as pint milk cartons. To facilitate stacking of containers, there is provided indentation 104 in top 82 of cover 14. This indentation 104 has a squared-off surface area having substantially identical dimensions to the base of the container to be stacked. Thus, an upper stacked container does not tend to slide laterally off the supporting top 82 of cover 14. To facilitate supporting a carton (shown in dotted lines in FIG. 2), there is provided second indentation 106 in top 82 of cover 14. This second indentation is also squared off and has substantially identical dimensions to those of the carton. When the carton is seated in indentation 106, it does not tend to move sideways. The surface area of indentation 106 is smaller than that of surface area 104, but one side of area 106 is common with a portion of side 108 of area 104.

To facilitate opening and closing the container, there is provided thumb niche 110 in cover 14. Both cover 14 and tray 12 include, respectively, slots 112 and 114 which result from the formation of V-shaped members 48 and 50. These slots 112 and 114 serve as means which facilitate grasping and carrying of container 10.

Tray 12 may have more than three cavities, but preferably it does not have more than five. The construction material should be sufficiently rigid to provide structural strength, and be a heat insulator and moisture barrier. Suitable materials are foam plastics, such as polystyrene, polyethylene, alphabutadiene styrene, polypropylene, and polyvinylchloride. The tray and cover are preferably fabricated from foamed polystyrene for best heat insulation properties. We have found that, over prolonged periods, six to eight of our containers 10, filled with hot food, can be stacked one upon the other without collapsing or substantial cooling of the food.

We believe the above description is an adequate disclosure to enable persons skilled in the art to make and use our invention. However, we wish to supplement this disclosure by incorporating by reference the design application entitled "Hot Food Container," filed herewith in the names of Steven J. Cry, Mark W. Whelan, and Kenneth L. Jones.

We claim:

1. A container made from a continuous sheet of foamed plastic, and comprising a cover and a tray hinged together along a contiguous section, said cover and tray each including circumferential lips which abut when the cover is fitted over the tray, and said tray also having, integral with the tray lip, cover-receiving means which include a locking portion opposite the contiguous section, said locking portion including a reverse-tapered sidewall which provides means into which a portion of the cover lip is force fitted upon closure of the cover, and a pair of spaced, generally vertical, upwardly projecting flanges which are continuous with the locking portion at the extremities of the locking portion and which extend from these extremities toward the contiguous section, said flanges being at about a maximum height at their point of continuity with the locking portion and thereafter tapering towards the contiguous section to become substantially flush with the tray lip near the contiguous section.

2. The container defined in claim 1 wherein both the tray and the cover each include a generally V-shaped divider and support member which divides both the tray and the cover into cavity sections, and which, when the cover is fitted over the tray, abut each other to impart structural rigidity to the container.

3. The container defined in claim 2 wherein the V-shaped divider and support members each have at their extremities enlarged, deltalike ends.

4. The container defined in claim 3 wherein the deltalike ends are recessed relative to the abutting edges of the V-shaped members.

5. The container defined in claim 1 wherein the cover includes a first indentation defining a first surface area adapted to receive therein the base of a stacked container.

6. The container defined in claim 5 wherein the cover includes a second indentation defining a second surface area smaller than the first area and adapted to receive therein the base of a carton or the like.

7. The container defined in claim 6 wherein the first area is above the second area when the cover is fitted over the tray.

8. The container defined in claim 1 wherein the tray and cover are hinged together by means of two parallel creases in the contiguous section.

9. The container defined in claim 8 wherein the parallel creases are about 0.05–0.06 inches wide and about 0.06–0.07 inches apart.

* * * * *